G. H. Hawkins,
Doll Head.

Nº 81,999.     Patented Sep. 8, 1868.

Witnesses:     Inventor:

UNITED STATES PATENT OFFICE.

GEORGE H. HAWKINS, OF NEW YORK, N. Y.

IMPROVEMENT IN THE CONSTRUCTION OF DOLLS' HEADS.

Specification forming part of Letters Patent No. 81,999, dated September 8, 1868.

*To all whom it may concern:*

Be it known that I, GEORGE H. HAWKINS, of the city, county, and State of New York, have invented a new and useful Improvement in the Manufacture of Doll-Heads; and I do hereby declare that the following is a full, clear, and exact description thereof, which will enable others skilled in the art to make and use the same, reference being had to the accompanying drawings, forming a part of this specification.

This invention relates to a new and useful improvement in doll-heads, there being employed as a stock for same a textile or felted fabric or cloth, formed by weaving, felting, or other process, which is molded, when dressed with a suitable size, between dies heated in any proper manner, the dies giving the proper configuration to the head, while the heat of the former will dry the cloth, so that it will permanently retain the configuration thus given.

The head is molded in two separate parts by two pairs of dies, and said parts afterward lapped together, the lapped surfaces slightly moistened, and united by pressure through the agency of proper tools.

This improvement is a very cheap, durable, and almost indestructible, and at the same time neat and elegant, doll-head, and more desirable in every respect than the ordinary papier-maché and other heads.

Figures 1, 2:
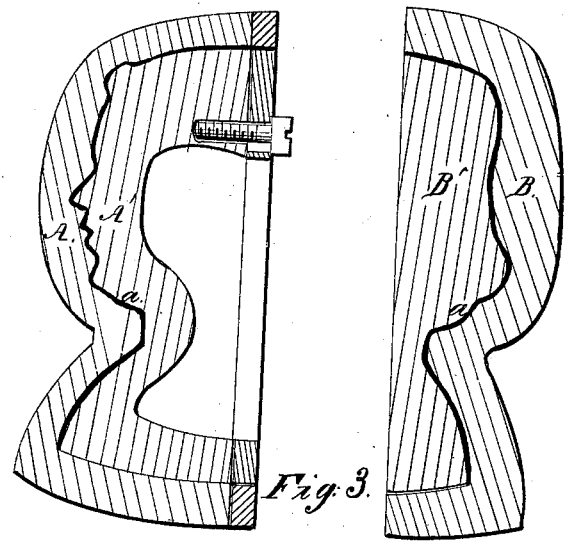
Figure 3:

In the accompanying sheet of drawings, Figures 1 and 2 are vertical sections of the dies employed for molding or giving the head the desired configuration; Fig. 3, a view of a head made according to my invention.

Similar letters of reference indicate corresponding parts.

A A' and B B' represent two pairs of dies, constructed of any suitable metal. The dies A A' are made of such a form as to give the desired configuration to the front half of the head, which includes, of course, the face, as shown in Fig. 1. The other dies, B B', give the proper configuration to the rear half of the head, as shown in Fig. 2.

I use as a stock or material for the manufacture of the heads buckram, muslin, or any cloth produced by weaving, felting, or other process, and saturated or dressed with starch, size, or any glutinous matter, and which, being moistened when required for use, is pressed, while damp, between the dies, which, being heated, will dry the cloth and press it into the required shape at one and the same operation, and the drying of the glutinous matter will enable the cloth to retain the configuration given by the dies.

The two parts of the head, after being thus formed, are adjusted together by lapping one part a short distance over the other, the lapped surfaces being properly moistened, and then pressed together by means of an inner and outer tool or tools, properly heated, and so constructed and arranged that one tool may be inserted within the head to form a bearing at the inner surface of the lap, while the other bears or presses against the exterior surface of the same. The pressure of these heated tools on the lapped surfaces, while moist, will form a close and tight seam, which is designated by $b$, Fig. 2.

Doll-heads may be very cheaply constructed in this way, and still be strong and durable, almost indestructible by ordinary usage. They may be enameled and colored equally as well as heads manufactured of any other known material.

Another advantage this invention possesses is that the features of the face may be brought out uniformly sharp and distinct, and they will remain so, owing to the nature of the material or stock, as cloth, whether woven or felted, has, when starched or sized and compressed between heated surfaces, a far greater degree of tenacity and toughness than any other substance the fibers of which depend alone for cohesion upon starch or size. Such substances, by compression, may be made quite dense and hard; but they are quite brittle, and, when made into thin hollow articles, like a doll-head, are very liable to break.

It is evident that by my improvements toy figure-heads other than those of dolls can be made, such as heads of animals, &c.

Having thus described my invention, what I claim as new, and desire to secure by Letters Patent, is—

A toy figure-head, when composed of a textile fabric which is previously stiffened with a glutinous material, then pressed in parts between heated dies, and afterward having the edges or seams of such parts joined by means of heated dies, in the manner substantially as herein described.

GEO. H. HAWKINS.

Witnesses:
 WM. DEAN OVERELL,
 ALEX. F. ROBERTS.